(12) United States Patent
Arima

(10) Patent No.: US 7,920,197 B2
(45) Date of Patent: Apr. 5, 2011

(54) IMAGE PICKUP APPARATUS

(75) Inventor: Makoto Arima, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 456 days.

(21) Appl. No.: 12/113,591

(22) Filed: May 1, 2008

(65) Prior Publication Data

US 2008/0278597 A1     Nov. 13, 2008

(30) Foreign Application Priority Data

May 7, 2007 (JP) ................................ 2007-122799
Mar. 14, 2008 (JP) ................................ 2008-066740

(51) Int. Cl.
*H04N 3/14* (2006.01)

(52) U.S. Cl. ........................................................ 348/312

(58) Field of Classification Search .................... 348/312
See application file for complete search history.

(56) References Cited

U.S. PATENT DOCUMENTS

| | | | |
|---|---|---|---|
| 6,522,359 B1 * | 2/2003 | Yamashita | 348/312 |
| 7,545,427 B2 * | 6/2009 | Tokunaga | 348/312 |
| 7,796,176 B2 * | 9/2010 | Mimata et al. | 348/312 |
| 2003/0025825 A1 * | 2/2003 | Nakajoh | 348/374 |
| 2004/0109065 A1 * | 6/2004 | Tokunaga | 348/207.99 |
| 2009/0244657 A1 | 10/2009 | Arima | 358/483 |

FOREIGN PATENT DOCUMENTS

| | | |
|---|---|---|
| JP | 04-096582 | 3/1992 |
| JP | 07-288660 | 10/1995 |
| JP | 2000-236487 | 8/2000 |
| JP | 2003-319133 | 11/2003 |
| JP | 2006-101191 | 4/2006 |

* cited by examiner

*Primary Examiner* — David L Ometz
*Assistant Examiner* — Dillon Durnford-Geszvain
(74) *Attorney, Agent, or Firm* — Fitzpatrick, Cella, Harper & Scinto

(57) ABSTRACT

An image pickup apparatus includes the following units. An image pickup unit captures an image and outputs an analog image signal. A conversion unit converts the analog image signal into a digital image signal. A synchronization signal generation unit generates a synchronization signal to be supplied to the image pickup unit and the conversion unit, and supplies the synchronization signal to the image pickup unit. An adjustment unit adjusts the timing at which the synchronization signal generated by the synchronization signal generation unit is supplied to the conversion unit, and supplies the synchronization signal to the conversion unit. The adjustment unit is disposed in a position such that the adjustment unit is affected by the self-heating of the image pickup unit.

12 Claims, 6 Drawing Sheets

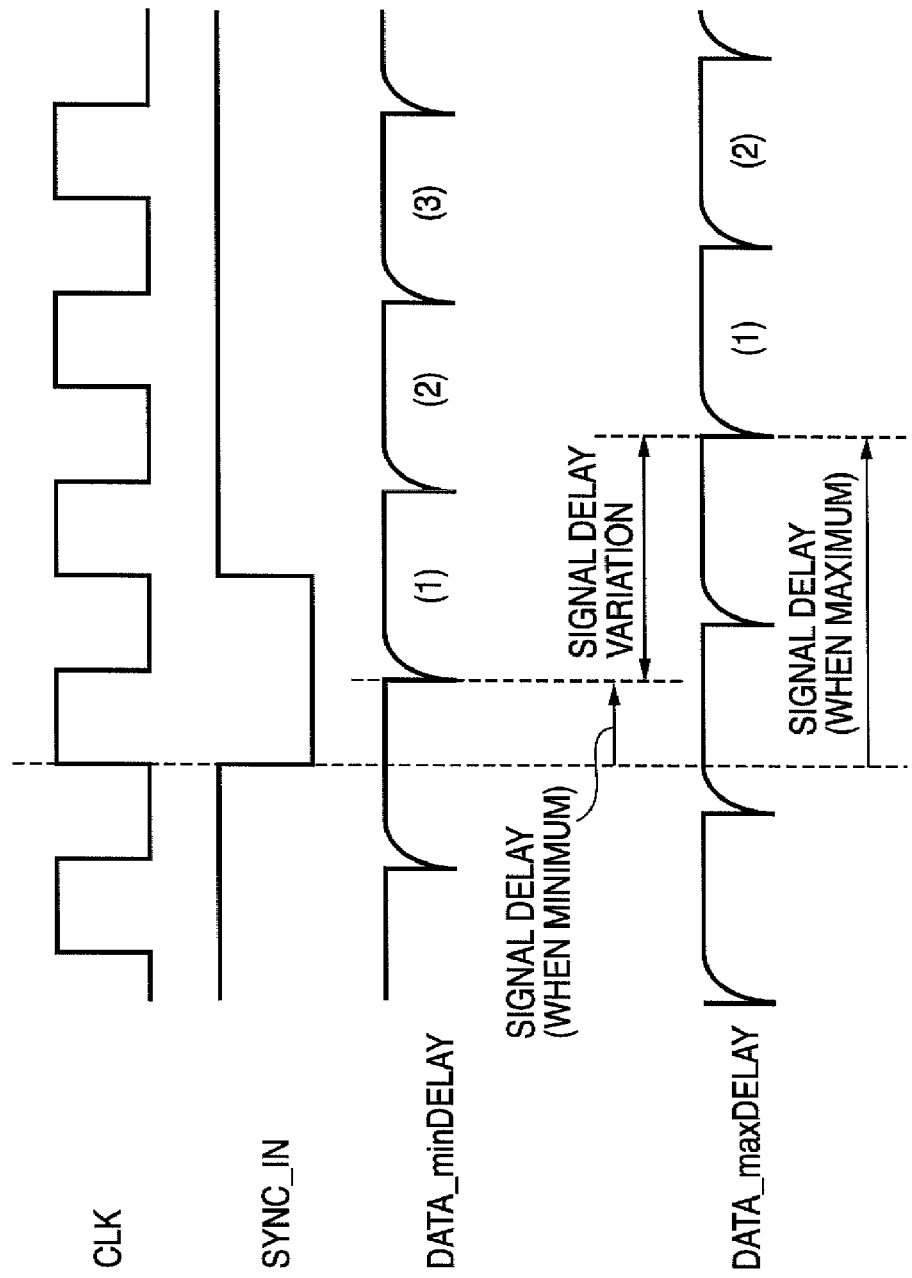

IMAGE PICKUP APPARATUS

BACKGROUND OF THE INVENTION

1. Field of the Invention

The present invention relates to an image pickup apparatus that acquires image information.

2. Description of the Related Art

A configuration in which drive signals are supplied to an image sensor and an A/D converter using a timing generator is known as a configuration for peripheral circuitry of an image sensor provided in an image pickup apparatus. For example, Japanese Patent Laid-Open No. 2003-319133 discloses a configuration in which drive signals are supplied by a control and drive clock generator to a CCD line sensor and an A/D converter.

FIG. 4 is a diagram illustrating a configuration for the peripheral circuitry of an image sensor provided in an image pickup apparatus according to the related art. A CPU 101 controls a timing generator 102, a CMOS sensor 103, and an A/D converter 104. The timing generator 102 generates and outputs an image sensor reference signal for driving the CMOS sensor 103 and an A/D converter drive signal for driving the A/D converter 104. The CMOS sensor 103 includes a photoelectric converter 105, a drive signal generation unit 106, and a serial interface 107. The photoelectric converter 105 converts light resulting from an original image into an analog image signal. The drive signal generation unit 106 generates an image sensor drive signal necessary for the photoelectric conversion. The serial interface 107 sends/receives control signals to/from the CPU 101. The A/D converter 104 converts the analog image signal into a digital image signal in accordance with the A/D converter drive signal received from the timing generator 102, and outputs that digital image signal.

Meanwhile, the drive signal generation unit 106 of the CMOS sensor 103 receives the image sensor reference signal outputted by the timing generator 102. The drive signal generation unit 106 then generates an image sensor drive signal required for the photoelectric conversion based on a synchronization signal and a reference clock included in the image sensor reference signal. The photoelectric converter 105 outputs the analog image signal in accordance with the image sensor drive signal.

FIG. 5 is a diagram illustrating the drive signal generation unit 106. A register 502 holds setting values included in control signals received from the CPU 101 via the serial interface 107 (FIG. 4). A counter 503 counts in synchronization with the reference clock included in the image sensor reference signal. A comparator 504 generates the image sensor drive signal and a mask signal by comparing the setting values held in the register 502 with the counter value of the counter 503. A mask unit 505 partially masks the image sensor reference signal in accordance with the mask signal from the comparator 504.

Incidentally, the analog image signal outputted by the CMOS sensor 103 is output so as to be delayed relative to the image sensor reference signal. This is due to the fact that signal delay occurs within the photoelectric converter 105 and the drive signal generation unit 106.

Meanwhile, the A/D converter 104 converts the analog image signal output by the CMOS sensor 103 to a digital image signal based on the A/D converter drive signal output by the timing generator 102, and outputs the digital image signal to a circuit in a later stage (for example, a shading circuit or the like).

It is necessary for the synchronization and phase relationships to be continuously maintained between the image signals and the drive signals of the various elements in order for a system that transmits such image signals to correctly transmit and process images. If the synchronization and phase relationships break down, the main scanning position becomes shifted, the A/D converter cannot correctly perform the A/D conversion, and so on.

The amount of delay of the analog image signal described above depends on changes in environmental conditions, such as the ambient temperature and operation state of the image sensor, the voltage of the power source, and so on, and thus is not constant. For this reason, with an image pickup apparatus configured as above, as the driving frequency of the image sensor increases, the variation in the amount of delay of the analog image signal output from the image sensor also increases relative to one pixel period of the digital image signal output from the A/D converter. This results in a breakdown of the synchronization relationship or phase relationship between the analog image signal and the drive signals of the elements in the elements of later stages (for example, the A/D converter), ultimately making correct image processing impossible.

FIG. 6 is a diagram illustrating an example of input/output signals in the image sensor. A CLK_IN signal and a SYNC_IN signal are signals included in the image sensor reference signal, and are input to the CMOS sensor 103. The CLK_IN signal is a reference clock for image transmission. The SYNC_IN signal is an image synchronization signal synchronized with the reference clock, and is a signal that, for example, indicates the main scanning start position for the image. The various elements hold the image in synchronization based on these signals. The CLK_IN signal and the SYNC_IN signal are also included in the image sensor drive signal and the A/D converter drive signal, and are input to the CMOS sensor 103 and the A/D converter 104. The CMOS sensor 103 outputs the analog image signal using the CLK_IN signal and the SYNC_IN signal as references.

At that time, the timing at which the analog image signal is output by the image sensor is delayed relative to the timing at which the reference clock is input to the image sensor. This delay varies depending on the environmental conditions mentioned above. To put it differently, the timing at which the analog image signal (DATA) is output fluctuates between a minimum signal delay (DATA_minDELAY) and a maximum signal delay (DATA_maxDELAY).

If this variation becomes greater than a single cycle of the reference clock, the synchronization relationship between the SYNC_IN signal and the analog image signal breaks down, making it impossible to correctly transmit image signals. It becomes less and less possible to ignore the variation in the signal delay the higher the frequency of the reference clock becomes.

However, even if the variation remains less than a single cycle of the reference clock, an increase in the proportion of the variation relative to the reference clock will lead to a change in the phase relationship between the analog image signal and the A/D converter drive signal in the A/D converter in a later stage. Accordingly, the timing at which the analog image signal is sampled cannot be uniquely determined, and thus the analog image signal cannot be correctly converted into a digital image signal.

SUMMARY OF THE INVENTION

It is a feature of the present invention to solve at least one of these and other problems. For example, it is a feature of the present invention to provide an image pickup apparatus capable of maintaining the synchronization and phase relationships between an image signal and a drive signal even if the driving frequency of the image sensor becomes high. Means to solve the other problems shall become apparent throughout the course of the following descriptions.

An image pickup apparatus includes the following units. An image pickup unit captures an image and outputs an analog image signal. A conversion unit converts the analog image signal into a digital image signal. A synchronization signal generation unit generates a synchronization signal to be supplied to the image pickup unit and the conversion unit, and supplies the synchronization signal to the image pickup unit. An adjustment unit adjusts a timing at which the synchronization signal generated by the synchronization signal generation unit is supplied to the conversion unit, and supplies the synchronization signal to the conversion unit. The adjustment unit is disposed in a position such that the adjustment unit is substantially affected by a self-heating of the image pickup unit.

Further features of the present invention will become apparent from the following description of exemplary embodiments (with reference to the attached drawings).

BRIEF DESCRIPTION OF THE DRAWINGS

FIG. 6 is a diagram illustrating an example of input/output signals in the image sensor.

DESCRIPTION OF THE EMBODIMENTS

An embodiment of the present invention shall be described hereinafter. The embodiment described hereinafter is of course useful in understanding the broader, intermediate, and more limitative concepts of the present invention. However, it should be noted that the technical scope of the present invention is defined by the appended claims, and is not intended to be limited by the embodiment described hereinafter.

Figure 1:
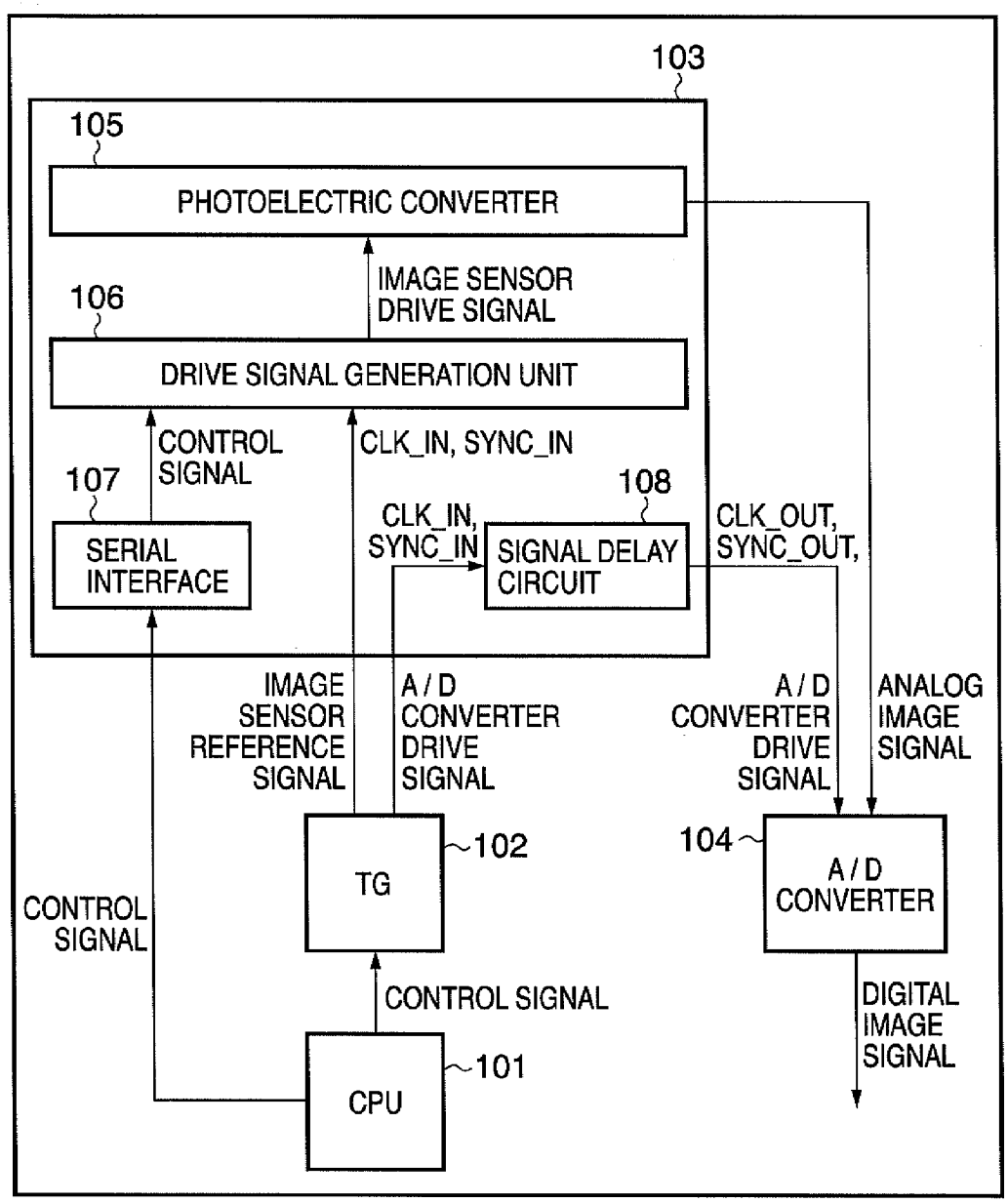
FIG. 1 is a block diagram illustrating an example of an image pickup apparatus according to an embodiment of the present invention.

FIG. 1 is a block diagram illustrating an example of an image pickup apparatus according to an embodiment of the present invention. A CPU 101 controls a timing generator 102, a CMOS sensor 103, and an A/D converter 104. The timing generator 102 generates and outputs both an image sensor reference signal for driving the CMOS sensor 103 and an A/D converter drive signal for driving the A/D converter 104. The timing generator 102 is therefore an example of a synchronization signal generation unit that generates a first drive signal and a second drive signal, which respectively correspond to the image sensor reference signal and the A/D converter drive signal, the signals being synchronized with one another.

The CMOS sensor 103 includes a photoelectric converter 105, a drive signal generation unit 106, and a serial interface 107. The photoelectric converter 105 converts light resulting from an original image into an analog image signal. In other words, the photoelectric converter 105 is an example of an image pickup unit that captures an image and outputs an analog image signal in accordance with the first drive signal.

The drive signal generation unit 106 generates an image sensor drive signal required for the photoelectric conversion. To explain in more detail, the drive signal generation unit 106 first receives the image sensor reference signal output by the timing generator 102. The drive signal generation unit 106 then generates an image sensor drive signal required for driving the photoelectric converter based on a synchronization signal SYNC_IN and a reference clock CLK_IN included in the image sensor reference signal. The photoelectric converter 105 outputs the analog image signal in accordance with this image sensor drive signal. It should be noted that the drive signal generation unit 106 employs a configuration such as that described above, as one example.

The serial interface 107 sends/receives control signals to/from the CPU 101. The A/D converter 104 converts the analog image signal into a digital image signal in accordance with the A/D converter drive signal emitted by the timing generator 102 and received via a signal delay circuit 108, and outputs the resultant.

The signal delay circuit 108 is an example of an adjustment unit that adjusts the difference between the timing at which the analog image signal arrives at the A/D converter 104 and the timing at which the second drive signal arrives at the A/D converter 104. Although this shall be described later, the signal delay circuit 108 is formed on the same semiconductor chip as the CMOS sensor 103. The signal delay circuit 108 is formed in such a manner to implement a configuration in which the influence of fluctuations in the environment (for example, fluctuations in the ambient temperature, power source voltage, and so on) exerted on the photoelectric converter 105 and the signal delay circuit 108 are substantially equal. In other words, the signal delay circuit 108 is provided in a position or with a configuration such that the influence of fluctuations in the environment exerted on the photoelectric converter 105 and the signal delay circuit 108 can be viewed as being substantially equal. Here, it should be noted that "fluctuation in the ambient temperature" refers not only to fluctuations in the temperature within the image pickup apparatus, but also to fluctuations in the temperature of the photoelectric converter 105 due to the self-heating of the photoelectric converter 105 itself. To rephrase, the signal delay circuit 108 is provided in a position or with a configuration such that the affection to the photoelectric converter 105 due to the self-heating emitted by the photoelectric converter 105 itself is substantially equal to the affection to the signal delay circuit 108 due to the self-heating emitted by the photoelectric converter 105. The signal delay circuit 108 is also an example of a signal delay unit that delays the second drive signal, thereby decreasing the difference between the timing at which the analog image signal arrives at the A/D converter 104 and the timing at which the second drive signal arrives at the A/D converter 104. Furthermore, the A/D converter 104 is an example of a conversion unit that converts the analog image signal into a digital image signal in accordance with the second drive signal, where the timing at which the second drive signal arrives at the A/D converter 104 has been adjusted, and outputs the resultant.

To give a more detailed explanation, the signal delay circuit 108 is a circuit that receives the A/D converter drive signal from the timing generator 102 and outputs the received A/D converter drive signal having delayed it by a predetermined amount of delay. The signal delay circuit 108 can be configured of, for example, a flip-flop and a delay buffer. In other words, the signal delay circuit 108 is a circuit by which the output timing of an internal flip-flop located in the final stage is adjusted so that the amount of delay of the analog image signal and the amount of delay of the A/D converted drive signal become equal. Here, the "amount of delay of the analog image signal" refers to the amount of delay of the analog image signal output by the CMOS sensor 103 relative to the image sensor reference signal input to the CMOS sensor 103. Meanwhile, the "amount of delay of the A/D converter drive signal" refers to the amount of delay of the A/D converter drive signal output by the CMOS sensor 103 relative to the A/D converter drive signal input to the CMOS sensor 103. A concrete example of the signal delay circuit 108 shall be provided later.

Figure 4:
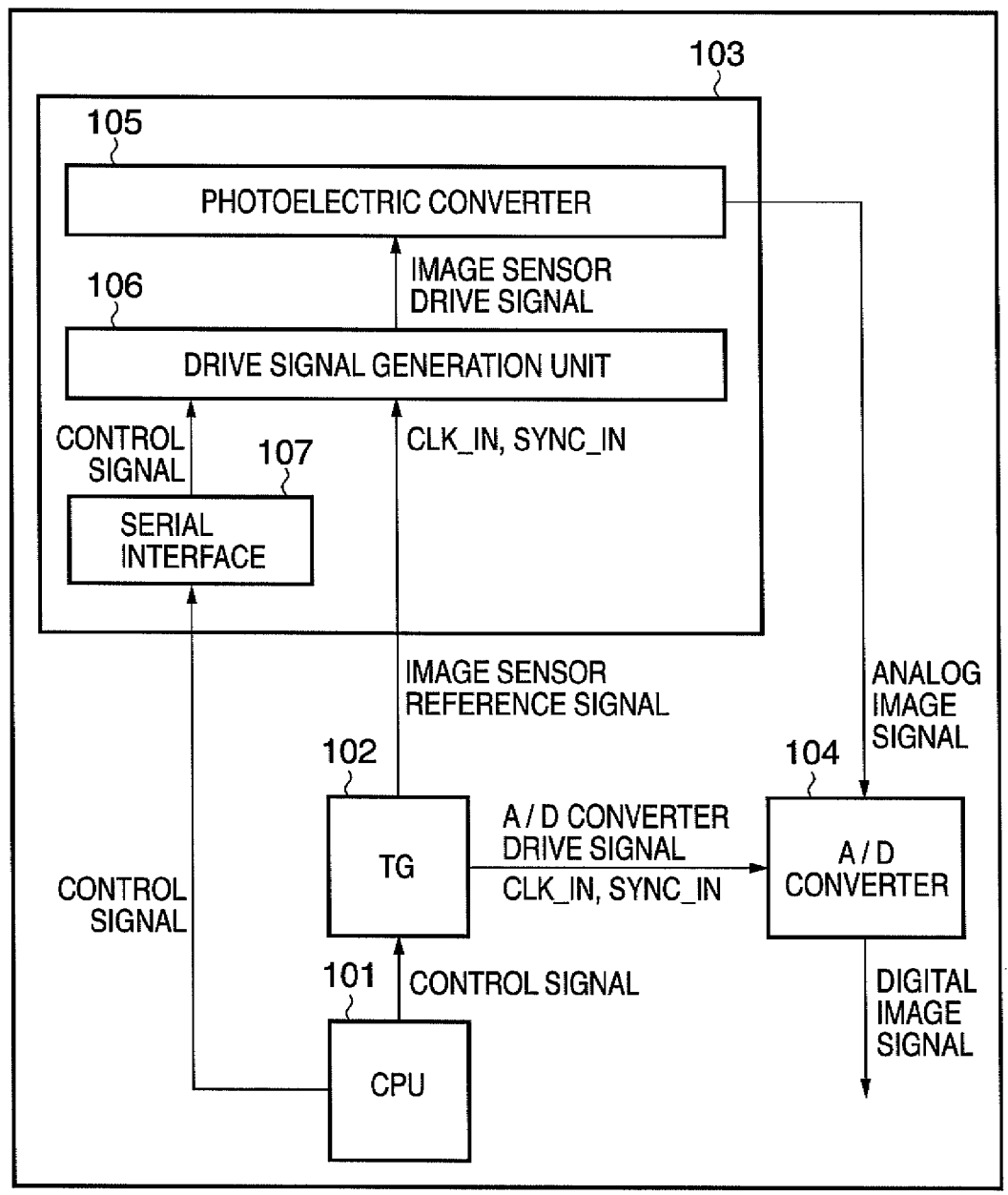
FIG. 4 is a diagram illustrating a configuration for peripheral circuitry of an image sensor provided in an image pickup apparatus according to the related art.
Figure 5:
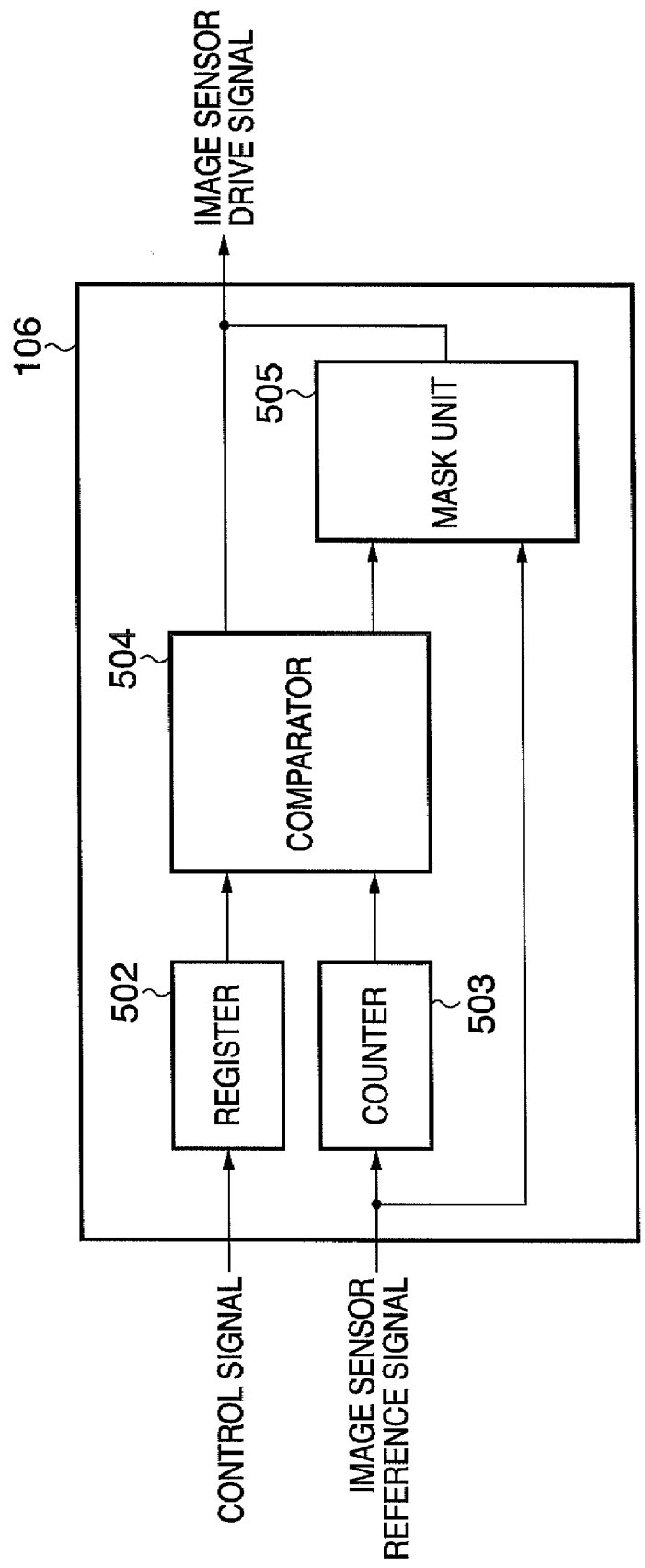
FIG. 5 is a diagram illustrating a drive signal generation unit 106.

The CMOS sensor 103 receives the A/D converter drive signal and the image sensor reference signal from the timing generator 102, and outputs the analog image signal and the A/D converter drive signal. In the related art, shown in FIG. 4, the A/D converter drive signal output by the timing generator 102 is input directly to the A/D converter. However, in the present embodiment, the A/D converter drive signal is input to the A/D converter 104 via the signal delay circuit 108, which is provided within the CMOS sensor 103.

It is ideal if the analog image signal is output by the CMOS sensor 103 at approximately the same time that the image sensor drive signal is input to the CMOS sensor 103. However, in reality, internal signal delay arises within the photoelectric converter 105, the drive signal generation unit 106, and other such circuits, in addition to propagation delay arising in the transmission line. According to the aforementioned related art, the timings at which the A/D converter drive signal and the analog image signal arrive at the A/D converter 104 are not coincide with each other, even if the synchronization and phase relationships between the image sensor reference signal and the A/D converter drive signal are normal at the point in time where those signals are output by the timing generator. In other words, the synchronization and phase relationships between the A/D converter drive signal and the analog image signal break down.

However, in the present embodiment, the difference between the timing at which the analog image signal arrives and the timing at which the A/D converter drive signal arrives is reduced by causing the A/D converter drive signal to pass through the signal delay circuit 108 provided within the CMOS sensor 103. In other words, the synchronization and phase relationships between the A/D converter drive signal and the analog image signal can be maintained.

Figure 2:
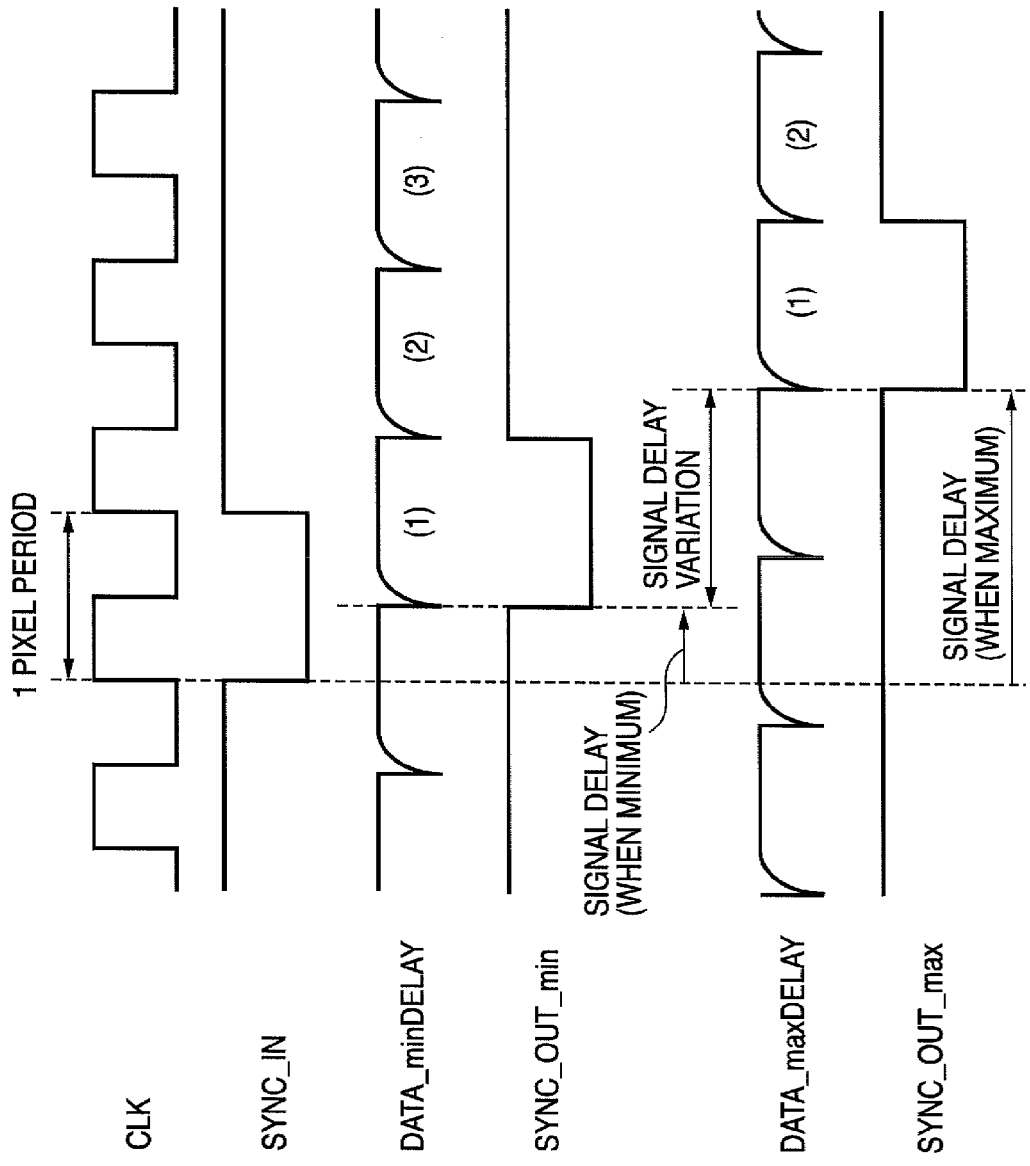
FIG. 2 is a diagram illustrating an example of the relationship between an input signal and an output signal with respect to an image sensor according to an embodiment of the present invention.

FIG. 2 is a diagram illustrating an example of the relationship between signals input to and output by the image sensor according to the present embodiment. The CLK_IN and SYNC_IN signals shown in FIG. 2 are the same as those described above. The CMOS sensor 103 outputs the analog image signal using the CLK_IN signal and the SYNC_IN signal as references.

A CLK_OUT signal and a SYNC_OUT signal are image synchronization signals included in the A/D converter drive signal outputted by the signal delay circuit 108. As described previously, the amount of delay of the signals differs depending on the environmental conditions. That is, the amount of delay varies in accordance with the environmental conditions. This refers to the fact that there is a minimum value and a maximum value with regards to the amount of delay, and the amount of delay takes on a value between those values. Here, the analog image signal is taken as DATA_minDELAY when the amount of delay is minimum, whereas the analog image signal is taken as DATA_maxDELAY when the amount of delay is maximum. As indicated in FIG. 2, when the variation in the signal delay, which is the difference between the minimum and maximum values of the amount of delay, exceeds one pixel period, circuits in the later stages cannot correctly execute processing.

In the present embodiment, CLK_OUT and SYNC_OUT signals imparted by the signal delay circuit 108 with the same amount of delay as that of the analog image signal output by the photoelectric converter 105 are output, which makes it possible to maintain the synchronization and phase relationships between the A/D converter drive signal and the analog image signal. To put it differently, taking the SYNC_OUT signal as an example, SYNC_OUT_min is output when the amount of delay of the analog image signal is a minimum, whereas SYNC_OUT_max is output when the amount of delay of the analog image signal is a maximum, as can be seen in FIG. 2. Through this, the A/D converter 104 can uniquely determine the timing at which the analog image signal is sampled.

Figure 3:
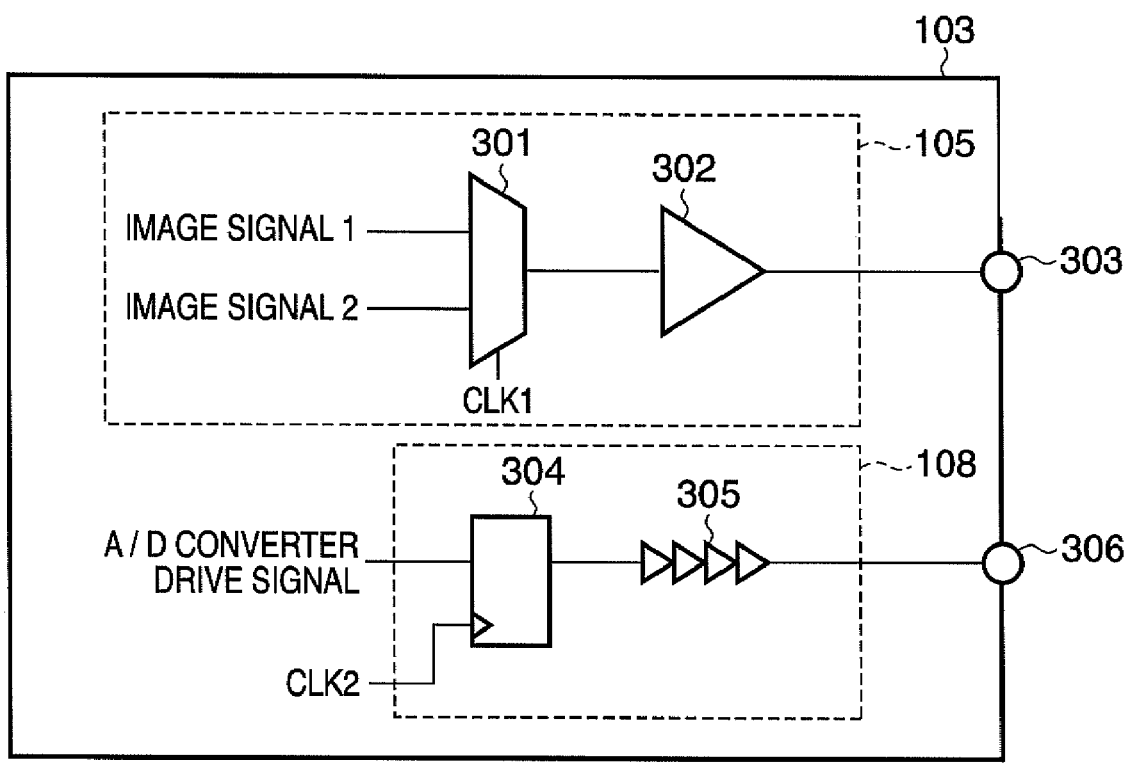
FIG. 3 is a block diagram illustrating an example of a CMOS sensor 103 and a signal delay circuit 108 thereof, according to an embodiment of the present invention.

FIG. 3 is a block diagram illustrating an example of the CMOS sensor 103 and the signal delay circuit 108 thereof, according to the present embodiment. A selector 301 is a selector or gate circuit disposed in the final stage of the image signal. Image signals are controlled by the changing point of a switching signal (CLK1) inputted to the selector 301. In other words, the switching signal (CLK1) switches which image signal is read out. Noted that image signals 1 and 2 are image signals output from odd-numbered and even-numbered pixels, respectively, of the photoelectric converter 105. An output amplifier 302 amplifies the image signal selected by the selector 301, and the amplified image signal is output by an image signal output terminal 303. Delay in the image signal therefore occurs due to delay caused by the wiring spanning from the selector 301 to the image signal output terminal 303, delay in the output amplifier 302, and so on.

The A/D converter drive signal and a signal (CLK2) synchronized with the switching signal of the selector 301 are inputted to a flip-flop 304 so as to delay the A/D converter drive signal by the same amount of delay as the image signal. The number of stages and wiring length of a delay buffer 305 are adjusted so that the amount of delay occurring between the flip-flop 304 and a drive signal output terminal 306 is the same as the amount of delay of the image signal. The number of stages and wiring length mentioned here are determined by performing an actual delay simulation when laying out the wiring during the logical circuit design of the CMOS sensor 103. It is desirable to take the ambient temperature, variations in the power source voltage, and the like into consideration during this simulation.

It should be noted that the selector 301, the output amplifier 302, and the delay buffer 305 are all created through the same semiconductor construction process, and thus the propensity for the delay amounts thereof to fluctuate with respect to the ambient temperature, variations in the power source voltage, and so on can be considered to be extremely similar. Accordingly, even if the ambient temperature, power source voltage, and so on fluctuate when the CMOS sensor 103 is being used, the delay amounts for each of the elements fluctuates in tandem. Therefore the amounts of delay in the analog image signal and the A/D converter drive signal can be caused to be the same.

According to the present invention, providing an adjustment unit that adjusts the difference between the timing at which the analog image signal arrives and the timing at which the A/D converter drive signal arrives makes it easy to maintain the synchronization and phase relationships between the image signal and the drive signal, even when the driving frequency of the image sensor is high. Of course, the image signal can therefore be correctly processed by the conversion unit, as well as by the circuits in later stages.

For example, the difference between the timings at which the analog image signal and the A/D converter drive signal arrive at the A/D converter 104 is reduced by providing the signal delay circuit 108, which delays the A/D converter drive signal.

As described above, the amount of delay is dependent on changes in the environmental conditions, such as the ambient temperature and operation state of the image sensor, the power source voltage, and so on. It is therefore desirable for the transmission lines of the A/D converter drive signal and the analog image signal to be placed in approximately identical environmental conditions. This is because placing these lines in approximately identical environmental conditions causes the amounts of delay of the A/D converter drive signal and the analog image signal to be approximately identical as well.

To achieve this, it is desirable for the photoelectric converter 105 and the signal delay circuit 108 to be formed on the same semiconductor chip. In other words, if the CMOS sensor 103 is also provided with a signal delay circuit, both circuits are created through the same semiconductor construction process, and therefore their propensities to fluctuate in accordance with the ambient temperature, variations in the power source voltage, and so on are also identical.

Of course, the signal delay circuit 108 does not necessarily have to be provided within the CMOS sensor 103. Other configurations may be employed in which the influence of fluctuations in the environment (for example, fluctuations in the ambient temperature, power source voltage, and so on) exerted on the photoelectric converter 105 and the signal delay circuit 108 are substantially equal. For example, the signal delay circuit 108 may be attached to a ceramic plate (a member that prevents warp of photoelectric converter 105) which in turn is attached to the photoelectric converter 105 in order to prevent the photoelectric converter 105 from being affected a warp. In other words, the signal delay circuit 108 is provided in a position or with a configuration such that the influence exerted on the photoelectric converter 105 due to the heat emitted by the photoelectric converter 105 itself is substantially equal to the influence exerted on the signal delay circuit 108. Alternatively, the signal delay circuit 108 may be disposed external to the CMOS sensor 103, as long as the amounts of delay in the A/D converter drive signal and the analog image signal remain approximately the same even if the environmental conditions change.

Note that the amount of delay in a signal also depends on the length of the transmission line. Therefore, it is preferable for the length of the transmission line of the image sensor reference signal to be the same (have the same wiring length) as the length of the transmission line of the A/D converter drive signal, with respect to the transmission lines spanning from the timing generator 102 to the CMOS sensor 103 (the photoelectric converter 105). Similarly, it is preferable for the length of the transmission line of the image sensor reference signal to be the same (have the same wiring length) as the length of the transmission line of the A/D converter drive signal, with respect to the transmission lines spanning from the CMOS sensor 103 (the photoelectric converter 105) to the A/D converter 104. This makes it possible to even further reduce the difference in the phase between the analog image signal and the A/D converter drive signal.

The amount of delay imparted on the A/D converter drive signal by the signal delay circuit 108 may be a value determined through an actual delay simulation executed in advance, when the semiconductor chip is designed. Meanwhile, a CMOS sensor is merely one example of an image sensor, and an image sensor of a different configuration, such as a CCD sensor or the like, may be used as well.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-122799, filed on May 7, 2007 and Japanese Patent Application No. 2008-066740 filed on Mar. 14, 2008 which are hereby incorporated by reference herein in their entirety.

What is claimed is:

1. An image pickup apparatus comprising:
   an image pickup unit which captures an image and outputs an analog image signal;
   a conversion unit which converts the analog image signal into a digital image signal;
   a synchronization signal generation unit which generates a synchronization signal to be supplied to the image pickup unit and to the conversion unit, and which supplies the synchronization signal to the image pickup unit; and
   an adjustment unit which adjusts a timing at which the synchronization signal generated by the synchronization signal generation unit is supplied to the conversion unit, and which supplies the synchronization signal to the conversion unit at the adjusted timing,
   wherein the adjustment unit is disposed in a position such that the adjustment unit is substantially affected by a self-heating of the image pickup unit,
   wherein a delay amount of the analog image signal of the image pickup unit fluctuates in accordance with a fluctuation of a heat affecting the image pickup unit; and
   wherein a delay amount of the synchronization signal of the adjustment unit fluctuates in accordance with a fluctuation of a heat affecting the adjustment unit.

2. The image pickup apparatus according to claim 1, wherein the adjustment unit includes a signal delay unit which delays the synchronization signal to be supplied to the conversion unit.

3. The image pickup apparatus according to claim 1, wherein the image pickup unit and the adjustment unit are formed on a same semiconductor chip.

4. The image pickup apparatus according to claim 3, wherein a length of a transmission line for supplying the synchronization signal from the synchronization signal generation unit to the image pickup unit is the same as a length of the transmission line for supplying the synchronization signal from the synchronization signal generation unit to the adjustment unit.

5. The image pickup apparatus according to claim 3, wherein a length of the transmission line for supplying the analog image signal from the image pickup unit to the conversion unit is the same as a length of the transmission line for supplying the synchronization signal from the adjustment unit to the conversion unit.

6. The image pickup apparatus according to claim 4, wherein a length of the transmission line for supplying the analog image signal from the image pickup unit to the conversion unit is the same as a length of the transmission line for supplying the synchronization signal from the adjustment unit to the conversion unit.

7. The image pickup apparatus according to claim 1, wherein the adjustment unit is formed upon a member that prevents a warp of the image pickup unit.

8. The image pickup apparatus according to claim 7, wherein the member is a ceramic plate.

9. An image pickup apparatus comprising:
an image pickup unit which captures an image and outputs an analog image signal;
a conversion unit which converts the analog image signal into a digital image signal;
a synchronization signal generation unit which generates a synchronization signal to be supplied to the image pickup unit and to the conversion unit, and which supplies the synchronization signal to the image pickup unit; and
an adjustment unit which adjusts a timing at which the synchronization signal generated by the synchronization signal generation unit is supplied to the conversion unit, and which supplies the synchronization signal to the conversion unit at the adjusted timing,
wherein the image pickup unit and the adjustment unit are formed on a same semiconductor chip,
wherein a delay amount of the analog image signal of the image pickup unit fluctuates in accordance with a fluctuation of a heat affecting the image pickup unit; and
wherein a delay amount of the synchronization signal of the adjustment unit fluctuates in accordance with a fluctuation of a heat affecting the adjustment unit.

10. An image pickup apparatus comprising:
an image pickup unit which captures an image and outputs an analog image signal;
a conversion unit which converts the analog image signal into a digital image signal;
a synchronization signal generation unit which generates a synchronization signal to be supplied to the image pickup unit and to the conversion unit, and which supplies the synchronization signal to the image pickup unit; and
an adjustment unit which adjusts a timing at which the synchronization signal generated by the synchronization signal generation unit is supplied to the conversion unit, and which supplies the synchronization signal to said conversion unit at the adjusted timing,
wherein the adjustment unit is formed upon a member that prevents a warp of the image pickup unit,
wherein a delay amount of the analog image signal of the image pickup unit fluctuates in accordance with a fluctuation of a heat affecting the image pickup unit; and
wherein a delay amount of the synchronization signal of the adjustment unit fluctuates in accordance with a fluctuation of a heat affecting the adjustment unit.

11. An image pickup apparatus comprising:
an image pickup unit which captures an image and outputs an analog image signal;
a conversion unit which converts the analog image signal into a digital image signal;
a synchronization signal generation unit which generates a synchronization signal to be supplied to the image pickup unit and to the conversation unit, and which supplies the synchronization signal to the image pickup unit; and
an adjustment unit which adjusts a timing at which the synchronization signal generated by the synchronization signal generation unit is supplied to the conversion unit, and which supplies the synchronization signal to the conversion unit at the adjusted timing,
wherein the adjustment unit is disposed in a position such that the adjustment unit is substantially affected by a self-heating of the image pickup unit, and
wherein a length of a transmission line for supplying the synchronization signal from the synchronization signal generation unit to the image pickup unit is the same as a length of the transmission line for supplying the synchronization signal from the synchronization signal generation unit to the adjustment unit.

12. An image pickup apparatus comprising:
an image pickup unit which captures an image and outputs an analog image signal;
a conversion unit which converts the analog image signal into a digital image signal;
a synchronization signal generation unit which generates a synchronization signal to be supplied to the image pickup unit and to the conversion unit, and which supplies the synchronization signal to the image pickup unit; and
an adjustment unit which adjusts a timing at which the synchronization signal generated by the synchronization signal generation unit is supplied to the conversion unit, and which supplies the synchronization signal to the conversion unit at the adjusted timing,
wherein the adjustment unit is disposed in a position such that the adjustment unit is substantially affected by a self-heating of the image pickup unit, and
wherein a length of the transmission line for supplying the analog signal from the image pickup unit to the conversion unit is the same as a length of the transmission line for supplying the synchronization signal from the adjustment unit to the conversion unit.

* * * * *